(12) United States Patent
Wang

(10) Patent No.: US 11,375,851 B1
(45) Date of Patent: Jul. 5, 2022

(54) TEMPERATURE REGULATING DEVICE FOR BEVERAGE

(71) Applicant: Haichao Wang, Juancheng (CN)

(72) Inventor: Haichao Wang, Juancheng (CN)

( * ) Notice: Subject to any disclaimer, the term of this patent is extended or adjusted under 35 U.S.C. 154(b) by 0 days.

(21) Appl. No.: 17/586,837

(22) Filed: Jan. 28, 2022

(51) Int. Cl.
| | |
|---|---|
| *A47J 41/00* | (2006.01) |
| *B65D 81/38* | (2006.01) |
| *F25D 31/00* | (2006.01) |

(52) U.S. Cl.
CPC ...... *A47J 41/0044* (2013.01); *B65D 81/3844* (2013.01); *F25D 31/002* (2013.01); *F25D 31/003* (2013.01); *B65D 2543/00046* (2013.01); *F25D 2303/0841* (2013.01); *F25D 2303/0842* (2013.01)

(58) Field of Classification Search
CPC ............. A47J 41/0044; B65D 81/3841; B65D 81/3844; B65D 2543/0046; F25D 31/002; F25D 31/003; F25D 2303/0841; F25D 2303/0842; F25D 2303/084
See application file for complete search history.

(56) References Cited

U.S. PATENT DOCUMENTS

| | | | | |
|---|---|---|---|---|
| 2,163,057 A | * | 6/1939 | Duevel, Jr. ......... | A47J 41/0027 62/457.2 |
| RE26,724 E | * | 11/1969 | Paquin .................... | F25D 3/08 62/457.3 |
| 3,995,445 A | * | 12/1976 | Huskins .................... | F25D 3/00 62/530 |
| 4,163,374 A | * | 8/1979 | Moore .................. | F25D 31/007 220/592.01 |
| 4,638,645 A | * | 1/1987 | Simila ...................... | F25D 3/08 62/529 |
| 5,456,090 A | * | 10/1995 | McCoy .................... | F25D 3/08 215/11.1 |
| 7,810,348 B2 | * | 10/2010 | Shewchuk ............ | F25D 31/007 62/530 |
| 8,061,158 B2 | * | 11/2011 | Roth ........................ | F25D 3/08 62/457.3 |
| 11,059,634 B2 | * | 7/2021 | Yu ....................... | A47J 41/0061 |

(Continued)

*Primary Examiner* — Christopher R Zerphey
(74) *Attorney, Agent, or Firm* — Rumit R. Kanakia

(57) ABSTRACT

A temperature regulating device for a beverage comprises an upper cover, a first barrel and a second barrel connected below the upper cover, wherein the upper cover is provided with an inlet and an outlet for a beverage to flow in and out; the second barrel is located in the first barrel; a cavity for receiving the beverage is formed between the first barrel and the second barrel; the inlet and the outlet are communicated with the cavity; a first chamber for storing media is formed in the second barrel; the upper cover is recessed inward in the middle to form an inner concave part; the inner concave part is funnel-shaped, the bottom of the funnel bulges upward to form a conical convex part, and there are a plurality of inlets machined on the wall surface of the inner concave part, and the second barrel is connected below the convex part; the beverage is directly inverted at the position of the concave part, and enters the interior of the cavity from the inlet, so that the pouring of the beverage becomes convenient, and basically no splash occurs; the design of the convex part plays a certain drainage role, further avoiding the splash and quickly adjusting the temperature.

6 Claims, 4 Drawing Sheets

(56) References Cited

U.S. PATENT DOCUMENTS

| | | | |
|---|---|---|---|
| 11,142,675 B2* | 10/2021 | Ma | B65D 81/3869 |
| 2006/0196882 A1* | 9/2006 | Shimazaki | F25D 3/08 |
| | | | 220/737 |
| 2021/0401228 A1* | 12/2021 | Craft | A47G 19/2227 |

\* cited by examiner

//www.w3.org/1999/xhtml">
TEMPERATURE REGULATING DEVICE FOR BEVERAGE

TECHNICAL FIELD

The present invention relates to a temperature regulating device for a beverage.

BACKGROUND

In the fast-paced urban life, hot beverages and cold beverages generally need to be adjusted in advance to reach the acceptable range of the human body. For example, coffee needs to stand for a certain period of time after brewing, and can only be drunk when the temperature drops to a suitable temperature. However, in the process of life and work, there is an actual need to quickly cool the coffee. There is a beverage cooler in the market, which realizes the heat exchange between the hot beverage and the cooling medium by means of heat exchange. The main problems of the beverage cooler are as follows: the lid includes an elliptical lip, which surrounds the concave inclined surface, and the hot beverage flows into the beverage cooler along the inclined surface. During the pouring process, it is necessary to be slow and careful, otherwise the hot beverage will splash easily.

SUMMARY

In view of the shortcomings in the above problems, the present invention provides a temperature regulating device for a beverage.

In order to achieve the above purpose, the present invention provides a temperature regulating device for a beverage, which comprises an upper cover, a first barrel and a second barrel connected below the upper cover, wherein the upper cover is provided with an inlet and an outlet for a beverage to flow in and out; the second barrel is located in the first barrel; a cavity for receiving the beverage is formed between the first barrel and the second barrel; the inlet and the outlet are both communicated with the cavity; a first chamber for storing media is formed in the second barrel; the upper cover is recessed inward in the middle to form an inner concave part; the inner concave part is funnel-shaped, the bottom of the funnel bulges upward to form a conical convex part, and there are a plurality of inlets machined on the wall surface of the inner concave part, and the second barrel is connected below the convex part.

The upper cover is recessed inward in the middle part to form an inner concave part, and the beverage can be directly inverted at the position of the inner concave part, and enter the interior of the cavity from the inlet, the design of the inclined surface is cancelled, so that the pouring of the beverage becomes convenient, and basically no splashing phenomenon occurs; the design of the convex part increases the area of the fluid, plays a certain drainage role, and further avoids the possibility of splashing.

As a further improvement of the solution, the first barrel has an outer edge on which an outer barrel is connected, and a second chamber for storing media is formed between the outer barrel and the first barrel.

In the technical solution, the second chamber is formed outside the first barrel, and the beverage in the chamber can simultaneously exchange heat with the media in the first chamber and the second chamber, so that the temperature can be adjusted rapidly.

As a further improvement of the solution, the first barrel, the second barrel and the upper cover are connected by threads and a sealing ring is arranged at the connecting part, and the outer barrel and the outer edge are connected by threads and a sealing ring is arranged at the connecting part.

In the technical solution, the threaded connection is convenient for disassembly, cleaning and medium replacement, and the sealing ring plays a sealing role.

As a further improvement of the solution, the center of the convex part is provided with a first pinhole for internal and external air pressure balance, and the upper cover is provided with a second pinhole for internal and external air pressure balance, and the second pinhole penetrates the outer edge to be communicated with the second chamber.

In the above technical solution, the first pinhole is communicated with the first chamber, and the second pinhole is communicated with the second chamber. In the process of thermal expansion and cold contraction of the media in the first chamber and the second chamber, the internal and external air pressure balance is achieved through the action of the first pinhole and the second pinhole, and local deformation caused by pressure difference is avoided.

As a further improvement of the solution, a plug cover for plugging is arranged above the inner concave part.

In the technical solution, the plug cover plays a role in preventing dust and impurities from entering the cavity, thus ensuring the hygiene of the beverage.

As a further improvement of the solution, the first barrel and the second barrel are made of heat-conducting materials, and the outer barrel is made of heat-insulating materials.

In the above technical solution, the first barrel and the second barrel are made of heat-conducting material, which is convenient for rapid heat exchange, and the outer barrel is made of heat-insulating material, which avoids burning hands.

Compared with the prior art, the present invention has the following beneficial effects: the upper cover is recessed inward in the middle part to form an inner concave part, and the beverage can be directly inverted at the position of the inner concave part, and can enter the interior of the cavity from the inlet, the design of the inclined surface is cancelled, so that the pouring of the beverage becomes convenient, and the splash phenomenon basically does not occur; the design of the convex part increases the area of the fluid, plays a certain drainage role, and further avoids the possibility of splashing; the temperature adjusting device has a compact structure, a novel design and a high temperature adjusting efficiency.

Figure 1:
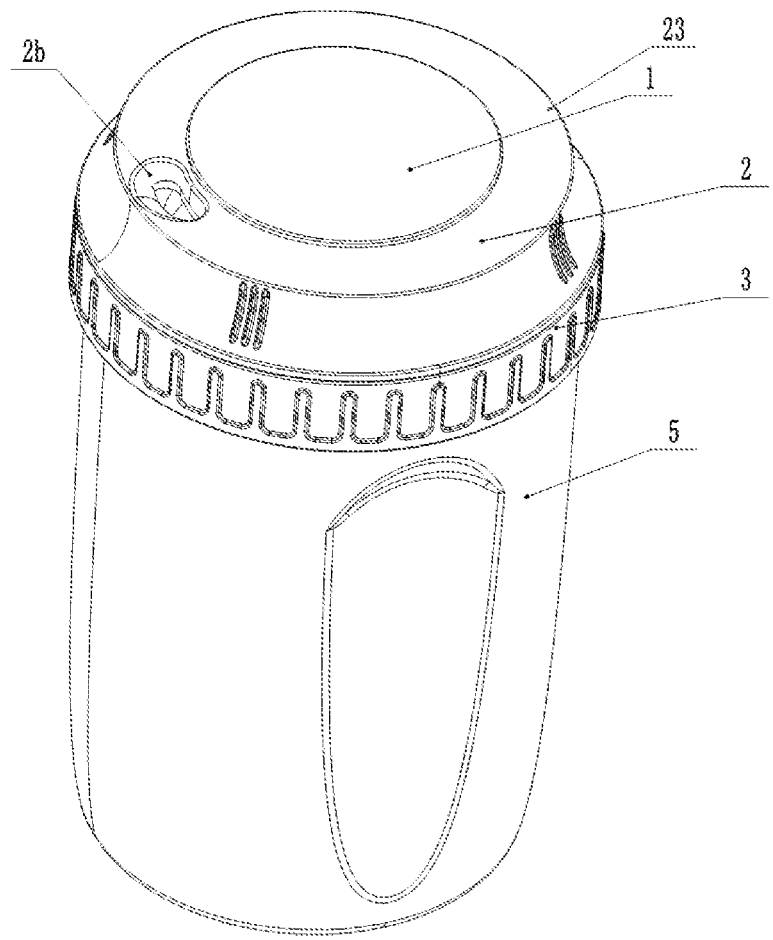
FIG. 1 is a perspective view of a temperature regulating device for a beverage of the present invention.

In the drawings: 1. Plug cover; 2. Upper cover; 2a. Inlet; 2b. Outlet; 21. Concave part; 22. Convex part; 21. First pinhole; 23. Second pinhole; 3. First barrel; 31. Outer edge; 4. Second barrel; 41. First chamber; 5. Outer barrel; 6. Cavity; 7. Second chamber.

DESCRIPTION OF EMBODIMENTS

As shown in FIGS. 1-4, a temperature regulating device for a beverage according to an embodiment of the present invention comprises an upper cover 2, and a first barrel 3 and a second barrel 4 connected below the upper cover 2. The upper cover 2 is provided with an inlet 2a and an outlet 2b for the beverage to flow in and out. The second barrel 4 is located in the first barrel 3. A cavity 6 for receiving the beverage is formed between the first barrel 3 and the second barrel 4. Both the inlet 2a and the outlet 2b are communicated with the cavity 6. A first chamber 41 for storing media is formed in the second barrel 4, the upper cover 2 is recessed inward in the middle to form an inner concave part 21, the inner concave part 21 is funnel-shaped, the bottom of the funnel bulges upward to form a conical convex part 22, and a plurality of inlets 2a are formed on the wall of the inner concave part 21, and the second barrel 4 is connected below the convex part 22; wherein, the first barrel 3 has an outer edge 31, and the outer barrel 5 is connected to the outer edge 31; a second chamber 7 for storing media is formed between the outer barrel 5 and the first barrel 3, and a second chamber is formed outside the first barrel, so that the beverage in the chamber can simultaneously exchange heat with the media in the first chamber and the second chamber, and the temperature can be adjusted rapidly; the first barrel 3, the second barrel 4 and the upper cover 2 are connected with each other by threads, and a sealing ring is arranged at the connecting part; the outer barrel 5 is connected with the outer edge 31 by threads, and a sealing ring is arranged at the connecting part; the threaded connection is convenient for disassembly, cleaning and medium replacement, and the sealing ring plays a sealing role; the center of the convex part 22 is provided with a first pinhole 221 for internal and external air pressure balance, and the upper cover 2 is provided with a second pinhole 23 for internal and external air pressure balance; the second pinhole 23 penetrates through the outer edge 31 to be communicated with the second chamber 7; the first pinhole is communicated with the first chamber and the second pinhole is communicated with the second chamber. During the process of thermal expansion and contraction of the media in the first chamber and the second chamber, the internal and external air pressure balance is achieved by the action of the first pinhole and the second pinhole; a plug cover 1 for blocking is arranged above the concave part 21, which plays a role in preventing dust and impurities from entering the cavity, thus ensuring the hygiene of the beverage; the first barrel 3 and the second barrel 4 are made of heat-conducting materials, the outer barrel 5 is made of heat-insulating materials, the first barrel and the second barrel are made of heat-conducting materials to facilitate rapid heat exchange, and the outer barrel is made of heat-insulating materials to avoid burning hands.

The upper cover is recessed inward in the middle part to form an inner concave part, and the beverage can be directly inverted at the position of the inner concave part, and enter the interior of the cavity from the inlet, and the design of the inclined surface is cancelled, so that the pouring of the beverage becomes convenient, and basically no splashing phenomenon occurs; the design of the convex part increases the area of the fluid, plays a certain drainage role, and further avoids the possibility of splashing; the temperature adjusting device has a compact structure, a novel design and a high temperature adjusting efficiency.

When in use, the present invention will be described with the attached drawings for convenience of understanding.

Figure 2:
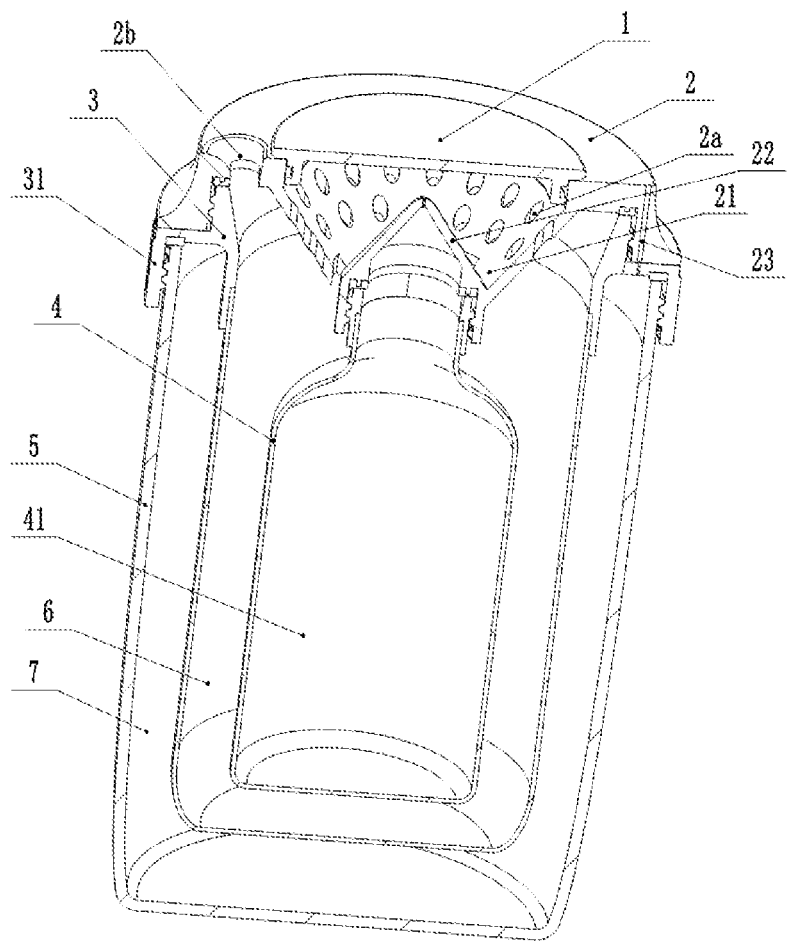
FIG. 2 is a sectional view of a temperature regulating device for a beverage of the present invention.
Figure 3:
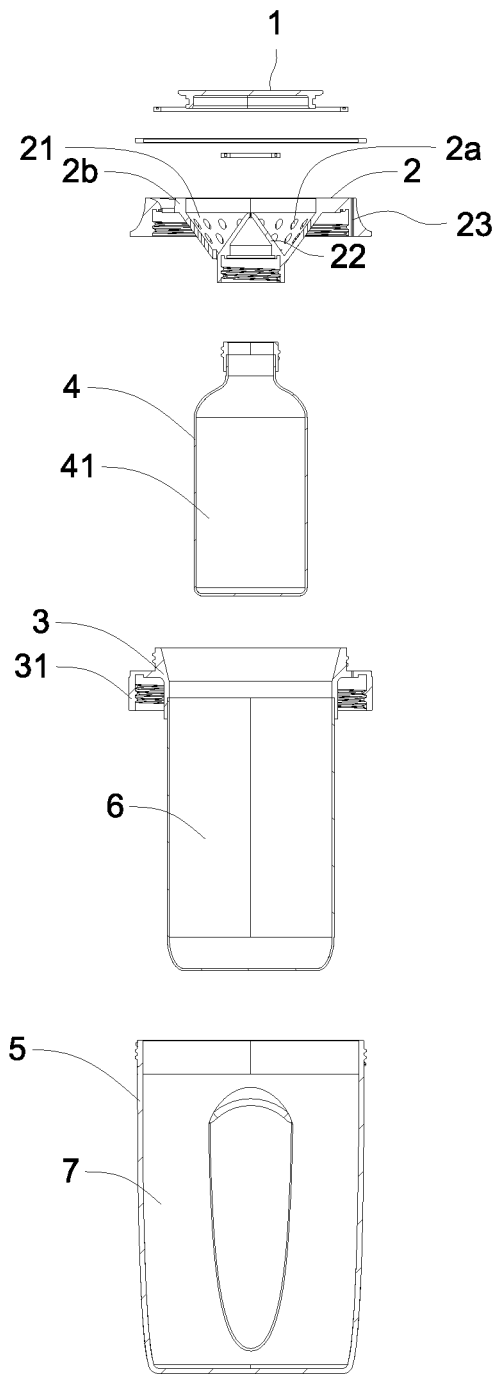
FIG. 3 is an exploded view of FIG. 2.
Figure 4:
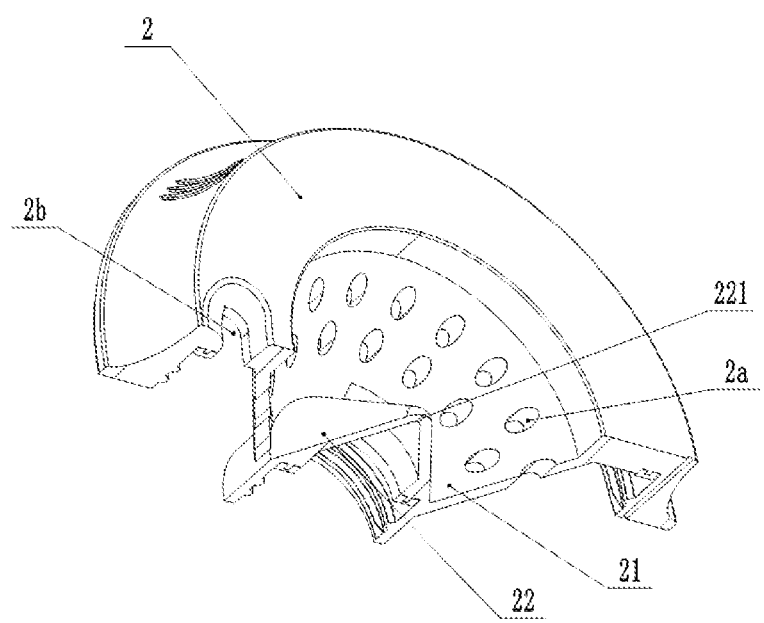
FIG. 4 is an enlarged view of the upper cover in FIG. 3.

Referring to FIG. 2, after the beverage (such as coffee) is prepared, the plug cover is removed, the coffee is poured on the inner concave part 21, and the coffee quickly enters the cavity 6 from inlets 2a by the drainage of the convex part 22. The coffee in the cavity 6 exchanges heat with the medium (such as ice water) in the first chamber 41 and the second chamber 7 quickly, and then the device is slowly inclined, and the coffee in the cavity 6 flows out through the outlet 2b, by which the temperature suitable for drinking is reached. The operation is very convenient, and the design of the concave part and convex part avoid splash of coffee in the process of entering the cavity 6.

What has been described above is only the preferred embodiment of the present invention, and it is not intended to limit the present invention. For those skilled in the art, the present invention can be modified and changed in various ways. Any modification, equivalent replacement, improvement and the like made within the spirit and principle of the present invention should be included in the scope of protection of the present invention.

What is claimed is:

1. A temperature regulating device for a beverage, comprising an upper cover (2), a first barrel (3) and a second barrel (4) connected below the upper cover (2), wherein the upper cover (2) is provided with an inlet (2a) and an outlet (2b) for the beverage to flow in and out, and the second barrel (4) is located in the first barrel (3); a cavity (6) for receiving the beverage is formed between the first barrel (3) and the second barrel (4), the inlet (2a) and the outlet (2b) are both communicated with the chamber (6), and a first chamber (41) for storing media is formed in the second barrel (4); the upper cover (2) is recessed inward in the middle to form an inner concave part (21), and the inner concave part (21) is funnel-shaped, the bottom of the funnel bulges upward to form a conical convex part (22); there are a plurality of inlets (2a) machined on the wall surface of the inner concave part (21), and the second barrel (4) is connected below the convex part (22).

2. The temperature regulating device for a beverage according to claim 1, wherein the first barrel (3) has an outer edge (31) on which an outer barrel (5) is connected, and a second chamber (7) for storing media is formed between the outer barrel (5) and the first barrel (3).

3. The temperature regulating device for a beverage according to claim 2, wherein the first barrel (3), the second barrel (4) and the upper cover (2) are connected by threads and a sealing ring is provided at a connecting part, and the outer barrel (5) and the outer edge (31) are connected by threads and a sealing ring is provided at a connecting part.

4. The temperature regulating device for a beverage according to claim 3, wherein the center of the convex part (22) is provided with a first pinhole (221) for balancing internal and external air pressures, and the upper cover (2) is provided with a second pinhole (23) for balancing internal and external air pressures, and the second pinhole (23) penetrates through the outer edge (31) to be communicated with the second chamber (7).

5. The temperature regulating device for a beverage according to claim 4, wherein a plug cover (1) for blocking is arranged above the concave part (21).

6. The temperature regulating device for a beverage according to claim 1, wherein the first barrel (3), the second barrel (4) are made of heat conducting materials, and the outer barrel (5) is made of heat insulating materials.

* * * * *